United States Patent [19]

Barksby

[11] Patent Number: 4,963,637

[45] Date of Patent: Oct. 16, 1990

[54] ACID CONTAINING ISOCYANATE-TERMINATED PREPOLYMERS, SALT PREPOLYMERS AND POLYMERS THEREOF

[75] Inventor: Nigel Barksby, Dunbar, W. Va.

[73] Assignee: Union Carbide Chemicals and Plastics Company Inc., Danbury, Conn.

[21] Appl. No.: 370,722

[22] Filed: Jun. 23, 1989

[51] Int. Cl.$^5$ ............................................. C08G 18/06
[52] U.S. Cl. ...................................... 528/59; 560/157; 560/158
[58] Field of Search .................... 528/59; 560/157, 158

[56] References Cited

U.S. PATENT DOCUMENTS

| | | | |
|---|---|---|---|
| 4,207,227 | 6/1989 | von Bonin | 260/40 TN |
| 4,250,077 | 2/1981 | von Bonin et al. | 260/37 N |
| 4,460,738 | 7/1984 | Frentzel et al. | 524/591 |
| 4,521,615 | 6/1985 | Frentzel | 560/198 |
| 4,528,334 | 7/1985 | Knopf et al. | 525/404 |
| 4,701,474 | 10/1987 | Bailey, Jr. et al. | 521/137 |

*Primary Examiner*—Maurice J. Welsh
*Attorney, Agent, or Firm*—Paul W. Leuzzi, III

[57] ABSTRACT

The present invention is directed to novel isocyanate-terminated prepolymers of carboxylic acid grafted polyethers, salts of these prepolymers and fully reacted polymers formed therefrom. More specifically, the present invention relates to reacting an ethylenically unsaturated mono-carboxylic acid with a polyether in the presence of a free radical initiator to form a graft copolymer. Acid-containing isocyanate-terminated prepolymers can then be formed by reacting the graft copolymer with an isocyanate. Salt-containing isocyanate-terminated prepolymers are prepared through the reaction between the acid-containing prepolymer and a base. Finally, polymers are formed by curing either of these isocyanate-terminated prepolymers with an isocyanate reactive material.

29 Claims, No Drawings

ACID CONTAINING ISOCYANATE-TERMINATED PREPOLYMERS, SALT PREPOLYMERS AND POLYMERS THEREOF

BACKGROUND OF THE INVENTION

1. Field of the Invention:

The present invention is directed to novel isocyanate terminated prepolymers of carboxylic acid grafted polyethers, salts of these prepolymers and polymers derived therefrom. More specifically, the present invention relates to reacting an ethylenically unsaturated mono-carboxylic acid with a polyether in the presence of a free radical initiator to form a graft copolymer. Acid-containing isocyanate terminated prepolymers can thereafter be formed by reacting the graft copolymer with a polyisocyanate. Alternatively, salt-containing isocyanate terminated prepolymers can thereafter be formed by reacting the acid-containing prepolymer with a base. Finally, either the acid containing or salt containing isocyanate terminated prepolymer can be cured with an isocyanate reactive material to form a polymer.

2. Prior Art

Reactions of organic acids with polyols are well known. The best known reaction between these compounds is the formation of polyester polyols where the acid group of an organic di acid reacts with the hydroxyl group of a diol forming an ester linkage and eliminating water. Using a stoichiometric excess of hydroxyl groups the product can be hydroxyl terminated. This type of product is useful in the preparation of polyester based polyurethanes.

Technigues for producing copolymers by graft polymerizing ethylenically unsaturated monomers onto polymer backbones are, in general, well known. However, the resultant graft copolymers are often seriously contaminated with unwanted by-products resulting from side reactions, one common contaminant being homopolymers of the monomer used during the graft polymerization. An example of this can be found in U.S. Pat. No. 4,250,077. This patent teaches mixing olefinically unsaturated carboxylic acids with many types of polyols and polymerizing the mixture with free radical catalyst to produce a graft copolymer. The preferred acid is acrylic acid which polymerizes with itself. However, additional unsaturated monomers are preferably added to minimize the homopolymerization problem and improve the compatibility of the graft copolymer.

U.S. Pat. No. 4,460,738 teaches a protocol to overcome the problems associated with homopolymerization taught in U.S. Pat. No. 4,250,077 by grafting single di-carboxylic acid units at intervals onto the backbone of an oxyalkylene adduct. The acids are maleic, fumaric and itaconic and the initiators are of the peroxy type. These acids are specifically selected because they do not homopolymerize. However, these di-acids may readily undergo well.known undesired reactions such as dehydration thereby forming the five membered ring anhydride which can subseguently re-open in the presence of a hydroxyl compound. This leads to ester and half acid formation and causes unwanted viscosity build and loss of acid functionality thereby decreasing utility of the resultant polymer. These problems were recognized in this patent and they teach fumaric acid is preferred over maleic acid because "fumaric acid did not dissolve before reacting" resulting in reduced ester formation although they still tend to be generally dark in color and contain significant amounts of ester.

Surprisingly it has been found that isocyanate-terminated prepolymers of mono carboxylic acid grafted polyethers, salts of these prepolymers and fully reacted polymers formed from the salts offer advantages as evidenced by better product color, stability, viscosity, improved clarity and other processing advantages.

It will become evident from the detailed description that prior to the present invention there has been no disclosure of the use of mono carboxylic acid grafted polyethers in such systems. As previously stated, U.S. Pat. No. 4,460,738 teaches the use of di carboxylic acid grafted polyethers and states that "not all carboxylic acids or free radical initiators may be used for this reaction". It has now been found the mono-carboxylic acid grafted polyethers of this invention offer advantages over the materials described in the art including such features as stability and performance.

OBJECTS OF THE INVENTION

It is an object of the present invention to provide isocyanate-terminated prepolymers of carboxylic acid grafted polyethers, salts of these prepolymers and polymers derived therefrom that offer advantages as evidenced by better product color, stability, viscosity, improved clarity and other processing advantages.

SUMMARY OF THE INVENTION

The present invention provides acid-containing isocyanate-terminated prepolymers, salt-containing prepolymers and polymers thereof prepared from carboxylic acid grafted polyethers. The acid containing isocyanate terminated prepolymers are prepared by reacting the graft copolymer with a polyisocyanate. The salt containing isocyanateterminated prepolymers are prepared by reacting the acid-containing prepolymer with a base. Finally, polymers may be formed by curing either the acid or salt containing isocyanate terminated prepolymer with an isocyanate reactive material.

These novel polymers are useful as coatings, adhesives and other products.

DETAILED DESCRIPTION OF THE INVENTION:

In accordance with the present invention, an acid containing isocyanate terminated prepolymer is prepared by reacting a graft copolymer with a polyisocyanate. The graft copolymers are prepared by reacting an ethylenically unsaturated mono carboxylic acid with a polyether by methods well known in the art. For example, these copolymers can be prepared in accordance with the methods set forth in U.S. Pat. No. 3,418,354 which discloses the preparation of olefin-poly(oxyalkylene) graft copolymers by reacting an olefin, a peroxide compound and a poly(oxyalkylene) oxide. Another method for the preparation of acrylic or methacrylic graft copolymers of poly(oxyalkylene) is disclosed in U.S. Pat. No. 4,416,488.

Carboxylated poly(oxyalkylenes) have also been prepared by the method disclosed in U.S. Pat. No. 4,528,334 where acrylic acid has been grafted onto poly(oxyalkylene) compounds such as poly(oxyethylenes), poly(oxypropylenes) and copolymers thereof. The graft copolymers obtained by this method ar indicated to be substantially free of insoluble homopolymers and have improved solution and solubility properties.

Preferably, the graft copolymer is formed by separately adding the ethylenically unsaturated mono-carboxylic acid and a catalytic amount of the initiator to an agitated bath of the polyether, whereby all of said components are intimately admixed at a temperature suitable to decompose the initiator such that the initiator provides a source of free radicals to initiate the grafting reaction and maintaining this temperature until a graft copolymer is obtained. The catalyst and/or carboxylic acid reactants which are to be added to the polyether in the reaction zone may be mixed with a portion of the polyether prior to feeding to the reaction zone.

The polyethers used to make the graft copolymers are commercially available and well known in the art. Examples include NIAX ™ polyols available from Union Carbide and VORANOL ™ polyols available from Dow Chemical.

The carboxylic acids employed in the preparation of the graft copolymers include those carboxylic acids containing reactive unsaturation which can be grafted to the backbone of the polyether polyol using a suitable free-radical initiator and are generally represented by the formula:

$$CH_2\!=\!\underset{R}{\overset{\phantom{|}}{C}}\!-\!COOH \qquad (I)$$

wherein R represents hydrogen or a lower alkyl group. Illustrative of the carboxylic acids are acrylic, methacrylic, 2-ethylhexyl-acrylic, 2-propylacrylic, and the like.

It should be noted that the graft copolymers employed in preparing the acid-containing isocyanate-terminated prepolymers in the present invention differ from the products of the previously mentioned U.S. Pat. No. 4,460,738. Specifically, the patent employs di-carboxylic acids as opposed to mono-carboxylic acids used in the present invention. Hence polymers derived from the present invention differ from those utilizing only di-carboxylic acids.

The weight ratio of polyether to carboxylic acid is about 99:1 to about 60:40, preferably about 95:5 to about 70:30 and most preferably about 95:5 to about 80:20.

Formation of Acid Containing Isocyanate-Terminated Prepolymer

The art of preparing isocyanate-terminated prepolymers from conventional poly(alkylene)oxides and isocyanates is well known. The prepolymers of the present invention are prepared by reacting the graft copolymer described above with an organic polyisocyanate under conventionally known reaction conditions.

The acid-containing, isocyanate-terminated prepolymer of the present invention is generally of the formula:

$$R[C_2H_4O)_a(C_3H_6O)_b(C_nH_{2n}O)_c(C_mH_{2m-1}O)_d\underset{\underset{COOH}{|}}{\underset{C_pH_{2p}}{|}}CNQ(NCO)_g]_z \qquad (II)$$

(with an O double-bonded to C, and H on the backbone)

wherein R is an initiator radical based on a compound containing Zerewitinoff active hydrogen atoms. Such compounds are capable of initiating polymerization with alkylene oxides when used with a suitable catalyst (e.g. potassium hydroxide, zinc hexacyanocobaltate). Examples of such compounds include but are not limited to: difunctional compounds such as ethylene gylcol; propylene glycol, water, 1,4-butane diol, diethylene gylcol trifunctional compounds such as trimethylolpropane, glycerine, and other polyfunctional compounds such as pentaerythritol, and sorbitol.

Additional examples of compounds suitable for initiating the polymerization of alkylene oxides are various oligomeric polyols known in the art. When polyols (or other oligomers) are used for initiating polymerization of the alkylene oxides, their molecular weights can range from 400 to about 3000. When conventional initiators (such as described above) (i.e., glycerine, water, etc.) are used, their molecular weight can range from about 18 (for water) up to about 400. Preferably R contains from 2 to 6 carbon atoms and most preferably 3 to 6 carbon atoms.

a defines the ethylene oxide content of the acid containing, isocyanate-terminated prepolymer and can range from a value of zero to 175. The preferred range for "a" is 0 to 90.

b defines the propylene oxide content of the acid containing, isocyanate-terminated prepolymer and can range from a value of zero to 175. The preferred range for "b" is 0 to 90.

c defines the content of other alkylene oxides or cyclic ethers capable of polymerization that are present in the acid containing, isocyanate-terminated prepolymer and can range from a value of zero to 175. The preferred range for "c" is 0 to 90. Typical other alkylene oxides include but are not limited to 1,2-butylene oxide, 2,3- butylene oxide, isobutylene oxide, 1,2-epoxyoctadecane, and 1,2-epoxybutane. Typical cyclic ethers include but are not limited to tetrahydrofuran and oxetane.

d defines the number of oxide units in the polyether backbone containing acid grafted sites in the isocyanate-terminated prepolymer and can range from a value of 1 to 60. The preferred range for "d" is 1 to 20.

m is is an integer and ranges from 2 to "n".

n is an integer and ranges from 4 to about 20.

p is an integer and ranges from 2 to about 10.

Q is an organic radical which may be aliphatic or aromatic and is normally bonded to a minimum of 2 isocyanate groups. Illustrative radicals include but are not limited to phenyl, substituted phenyl, diphenylmethyl, naphthyl, hexyl, cyclohexyl, dicyclohexylmethyl, substituted cyclohexyl, xylylic, substituted xylylic and polyphenyl methyl.

g is an integer derived from the isocyanate functionality and preferably is 1 to 6, most preferably 1 to 2.

z is an integer derived from the number of Zerewitinoff active hydrogen atoms on R. z is preferably 2 to 6, and most preferably 2 to 3.

Two aspects of a, b and c are important and need to be emphasized. The first is that the sum of a+b+c must always be greater than or equal to 1. The second is that a, b and c indicate ethylene oxide, propylene oxide and alpha olefin oxide in any sequence, random or block, in any configuration.

The organic polyisocyanates that are useful in producing isocyanate-terminated prepolymers in accordance with this invention are organic compounds that contain at least two isocyanato groups. Such compounds are well-known in the art. Suitable organic polyisocyanates include the hydrocarbon diisocyanates (e.g., the alkylene diisocyanates and the arylene diisocyanates), as well as known triisocyanates and polymethylene poly (phenylene isocyanates). Examples of suitable polyisocyanates are 2,4-diisocyanatotoluene, 2,6-diisocyanatotoluene (TDI), methylene bis(4-cyclohexyl isocyanate), 3-isocyanatomethyl-3,5,5-trimethylcyclohexyl isocyanate (isophorone diisocyanate), 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl) sulfide, 1,7-diisocyanatoheptane, 1,5-diisocyanato-2,2-dimethylpentane, 1,9-diisocyanato-2,2,4-trimethylpentane, 1,9-diisocyanatononane, 1,10-diisocyanatodecane, 1,4-diisocyantocylohexane and isomers thereof, 1,10-diisocyanatopropyl)ether of 1,4-butylene glycol, 1,11-diisocyanatoundecane, 1,12-diisocyanatododecane bis(isocyanatohexyl) sulfide, 1,4-diisocyanatobenzene, 3,5-diiscyanato-o-xylene, 4,6-diisocyanato-m-xylene, 2,6-diisocyanato-p-xylene, tetramethylxylylene diisocyanate, 2,4-diisocyanato-1-chlorobenzene, 2,4-diisocyanato-1-nitrobenzene, 2,5-diisocyanato-1-nitrobenzene, 2,4' and 4,4'-diphenylmethylene diisocyanate (MDI), and derivatives thereof. Such derivatives include liquid forms as described in U.S. Pat. No. 3,394,164 and so called modified forms as described in U.S. Pat. No. 3,152,162.

Additional aromatic polyisocyanates include p-phenylene diisocyanate; dianisidine diisocyanate; bitolylene diisocyanate; naphthalene-1,4-diisocyanate; bis (3-methyl-3-isocyanatophenyl)methane; bis(3-methyl-4-isocyanatophenyl)methane; and 4,4'-diphenylpropane diisocyanate; and 3,3'-diphenyl-methylene diisocyanate, as described in the literature and in many patents, for example, U.S. Pat. Nos. 2,683,730; 2,950,263; 3,012,008; 3,344,162; and 3,362,979.

The preferred aromatic polyisocyanates for use the present invention are 2,4-diisocyanatotoluene (TDI) and the readily available TDI blend containing 80% of the 2,4 isomer and 20% of the 2,6 isomer.

The most preferred isocyanates are aliphatic isocyanates such as hexamethylene diisocyanate; bis-(4-isocyanatocyclohexyl)methane; 1,4-cyclohexane diisocyanate; 1,4-tetramethylene diisocyanate; m-1,1,3,3,-tetramethylxylylene diisocyanate; p-1,1,4,4,-tetramethylxylylene diisocyanate; 3-isocyanatomethyl-3,5,5-trimethylcyclohexyl isocyanate; and 1,10-decamethylene diisocyanate; and tetramethylxylylene diisocyanate.

Of course, the term polyisocyanate also includes quasi-prepolymers prepared by reaction of polyisocyanates with active hydrogen containing materials such as polyols or suitable low molecular weight glycols.

The reaction parameters for the isocyanate prepolymer forming step have been found to be not critical. The present invention should not be limited to any particular conditions for carrying out this step in the procedure. The ratio of the isocyanate (NCO) groups to hydroxyl (OH) groups is preferably in the range from about 1:1 to about 5:1; more preferably, in the range from about 1.1:1 to about 2:1. Varying the ratio is a useful way of adjusting the solubility of the prepolymer. Ratio's closer to 1:1 will generally give more water dispersible (but higher viscosity) prepolymers as the polymer will contain more carboxyl groups per molecule. The preferred reaction temperature for making the prepolymer is from about 25° C. to about 150° C., more preferably in the range from about 25° C. to about 100° C.

To promote prepolymer formation it is often desirable, but not necessary, to add a polyurethane catalyst to the reaction mixture. Amine catalysts are generally not desirable as they can react with the acid groups. Suitable catalysts are metal (e.g. tin, lead and copper) salts or organo-metallic catalysts. Dibutyltin dimaleate, stannous octoate, dibutyltin dilaurate, dibutyltin dilauryl sulfide, and dibutyltin oxide are examples of such metal catalysts. If used in the process of this invention, metal catalysts are employed in small amounts for example, from about 0.001 parts by weight to about 5 parts by weight of catalyst per 100 parts by weight of the grafted polyether.

The prepolymer may optionally be formed in the presence of a water miscible solvent. The solvent acts to aid in reducing the prepolymer viscosity and, if water miscible, assists in the dispersion of the prepolymer during the dispersion stage. Examples of suitable solvents include, but are not limited to, methylethylketone, acetone and N-methyl pyrrolidone. The solvent may be lft in the final polymer or may be removed at a later stage to make an organic solvent free polymer.

In the prepolymer formation step, it may be advantageous to add additional compounds which react with the isocyanate. These additional compounds are typically those used in the preparation of polyurethanes. In such case additional isocyanate will be required at the prepolymer formation step to ensure the prepolymer is isocyanate-terminated. They include for example polyether polyols, polyester polyols, polycaprolactone polyols and polymer polyols. However, the present invention should not be limited to any particular type of additional materials and all conventional materials known to react with isocyanates may be utilized.

Other, non-reacting additives may be included during the prepolymer formation step. Commonplace additives such as hardeners, emulsifiers, pigments, dyes, and leveling agents may be added to modify the prepolymer. External emulsifiers may be added to improve the water compatibility of the prepolymer. These include ionic emulsifiers such as alkali and ammonium salts of long chain fatty acids or long chain aryl or alkyl sulfonic acids and non-ionic emulsifiers such as ethoxylated alkyl benzenes having an average molecular weight of from 500 to about 10,000. These emulsifiers aid in the dispersion of the prepolymer and hence should not contain materials having active hydrogen groups which could react with the isocyanate.

These acid-containing isocyanate-terminated prepolymers can then be utilized to make useful items including adhesives and coatings.

Formation of Salt-Containing Isocyanate-Terminated Prepolymer

Salt-containing isocyanate-terminated prepolymers can be made from the acid-containing prepolymers described above. Salts may be formed from any suitable base that will readily form a salt with the pendant acid groups of the isocyanate-terminated prepolymer. The salt containing isocyanate-terminated prepolymer is of the general formula:

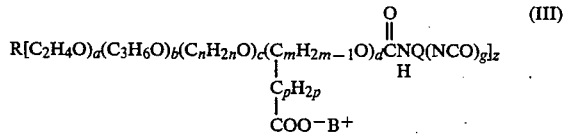

(III)

wherein the components are as defined in formula II and wherein $B^+$ is a cation preferably derived from an amine, metal hydroxide, carbonate or other suitable salt forming compound.

Suitable bases are tertiary amines which produce the desired ammonium salts. The amines may be substituted so long as the substituents do not adversely react with any of the components in the system. Accordingly, tertiary alkanolamines and tertiary amines such as triethylamine and the like are suitable.

Alkali metal hydroxides are also bases which can be utilized in forming the salt. However these strong bases can cause hydrolytic susceptibility of polyuretahen linkages in the prepolymer thereby impacting the polymer backbone. Minor amounts of these alkali metal hydroxides (preferably less thyan 25% of the stoichiometric equivalency of carboxyl groups) may be tolerated. At times, a small amount of alkali metal hydroxide, e.g., sodium or potassium hydroxide, is advantageous in promoting salt formation.

The preferred base is triethylamine. To provide optimum compatibility of the acid-containing prepolymer the amount of base added is preferably sufficient to neutralize all the pendant carboxylic acid groups. The use of less than the stoichiometric amount of the base is not normally desirable. Generally, an excess of the base is preferred and preferably up to 50% excess based on the weight of the stiochiometric requirement of the base is used. More preferably up to 10% excess based on weight of the stiochiometric amount is used. It has been found that addition of excess base improves the water compatibility of the prepolymer. However, the presence of excess base also raises the pH, increasing the hydrolytic susceptibility on the urethane groups in the prepolymer.

Salt formation is accomplished by simply mixing the acid-containing isocyanate-terminated prepolymer with the base and stirring with good agitation. If the material is to be used in aqueous solutions, then water may be added during or after salt formation. The amount of water added will depend on the type of graft polyether used and on the application for which the salt prepolymer will be used for. Generally, the amount of water required for most applications is such that the final polymer will contain about 20% to about 80% solids, where solids are calculated as everything except water and co-solvents. Optionally the acid groups in the prepolymer may be pre-neutralized before or during the prepolymer manufacture and before addition of the prepolymer to an aqueous medium.

These salt containing isocyanate-terminated prepolymers can then be utilized to make useful items including adhesives and coatings. These salt containing prepolymers are especially useful when the salt is hydrophilic rendering the prepolymer water compatible.

Formation of The Polymer

Any isocyanate-terminated prepolymer prepared as described above can be cured with an isocyanate reactive curative to form a polymer.

The polymer will contain at least one unit of the general formula

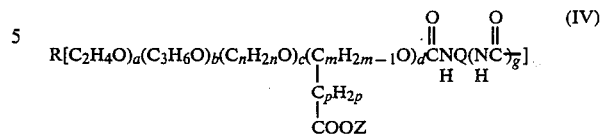

(IV)

wherein the components are as defined in formula III and wherein Z is $B^+$ or $H^+$.

The curative should be an isocyanate reactive, multifuntional material such as, but not exclusive to, diamines and triamines having at least one active hydrogen per nitrogen atom, or diols and triols, or mixtures thereof.

Preferable curatives include any compound having two or more active hydrogen groups and a molecular weight between about 18 and about 400. Specific examples include but are not limited to diols, triols, tetrols, aliphatic and aromatic diamines and triamines, hydrazines, dihydrazines and like compounds. Other suitable compounds include isophorone diamine, methylene bis di-aniline, diethyltoluene diamine and diols such as ethylene glycol, 1,4-butanediol and water. The preferred curatives are multi-functional amines. The most preferred are hydrazine and ethylene diamine.

Alternatively, the salt-containing prepolymer can be cured with a high molecular weight isocyanate reactive component. Suitable materials include, but are not limited to, polyether polyols, amine terminated polyethers and the like.

If the salt containing prepolymer is in an aqueous solution the curing step can be carried out by allowing the prepolymer to remain in the aqueous solution for sufficient time for the remaining isocyanate groups to react with the water or hydroxy functional neutralizing agent.

It may be desirable to add other prepolymers to modify the characteristics of the polymer. This would include prepolymers made from conventional materials known to react with isocyanates such as but not limited to polyether polyols, polyester polyols, amine terminated polyols, polycaprolactone polyols and polymer polyols.

Other additives may be used such as thickening agents. These are added to the polymer to give the desired viscosity depending on the final application. Suitable thickening agents known in the art (U.S. Pat. No. 3,923,713 Hermann) include methyl cellulose, hydroxyethyl cellulose, polyacrylic emulsions plus alkali, gums and the like.

The fully reacted polymer may be blended with other,dispersions. Furthermore, fillers, plasticizers, pigments, carbon black, and silica sols, aluminum clay and asbestos dispersions may be incorporated into these polymers. These additives are preferably added after the fully reacted polymer has been formed as this will eliminate possible side reactions between the reactive components in the polymer and the additives.

The fully reacted polymers of the present invention may be used as coatings and adhesives for fabrics, plastics, wood, metals and the like because of their advantageous properties such as good chemical resistance, abrasion resistance, toughness, elasticity, durability, and their ability to dry rapidly. Specific uses as coatings and adhesives include varnishes, coatings, packaging and furniture adhesives and the like.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

DEFINITIONS

As used in the Examples which follow, the terms and abbreviations set forth below have the meaning described.

PA: A polyoxyalkylene oxide diol, produced from propylene oxide and propylene glycol and having a hydroxyl number of about 280.

PB: A polyoxyalkylene oxide diol, produced from propylene oxide and propylene glycol and having a hydroxyl number of about 150.

PC: A polyoxyalkylene oxide diol, produced from propylene oxide and propylene glycol and having a hydroxyl number of about 110.

PD: A polyoxyalkylene oxide diol, produced from propylene oxide and propylene glycol starter and having a hydroxyl number of about 56.

PE: A polyoxyalkylene oxide diol, produced from propylene oxide and propylene glycol starter and having a hydroxyl number of about 37.

PF: A polyoxyalkylene oxide diol, produced from propylene oxide and propylene glycol starter and having a hydroxyl number of about 7.

PG: A polyoxyalkylene oxide diol, produced from propylene and ethylene oxides and propylene glycol starter and having a hydroxyl number of about 40. The ethylene oxide is present primarily in blocks and is used to "cap" the diol. Based on its alkylene oxide content this diol contains about 85 wt. % $C_3H_6O$ and about 15 wt. % $C_2H_4O$.

PH: A polyoxyalkylene oxide triol, produced from propylene and ethylene oxides and glycerine starter and having a hydroxyl number of about 23. The ethylene oxide is present primarily in blocks and is used to "cap" the triol. Based on its alkylene oxide content this diol contains about 93 wt. % $C_3H_6O$ and about 7 wt. % $C_2H_4O$.

PI: A polyoxyalkylene oxide diol, based on tetrahydrofuran having a hydroxyl number of about 110 and sold commercially as TERATHANE 1000 by DuPont.

PJ: A polyoxyalkylene oxide diol, produced from ethylene oxide and ethylene glycol and having a hydroxyl number of about 77.

PK: A polymer polyol based on polyol PG containing a stable dispersion of acrylonitrile/styrene copolymer, with a hydroxyl number of about 28.

GA: A grafted polyol which is 10% acrylic acid grafted where the polyol is PA.

GB: A grafted polyol which is 10% acrylic acid grafted where the polyol is PB.

GC: A grafted polyol which is 10% acrylic acid grafted where the polyol is PC.

GD: A grafted polyol which is 10% acrylic acid grafted where the polyol is PD.

GE: A grafted polyol which is 10% acrylic acid grafted where the polyol is PE.

GF: A grafted polyol which is 10% acrylic acid grafted where the polyol is PF.

GG: A grafted polyol which is 10% acrylic acid grafted where the polyol is PG.

GH: A grafted polyol which is 10% acrylic acid grafted where the polyol is PH.

GI: A grafted polyol which is 10% acrylic acid grafted where the polyol is PI.

GJ: A grafted polyol which is 5% acrylic acid grafted where the polyol is PJ.

GK: A grafted polyol which is 10% acrylic acid grafted where the polyol is PK.

GL: A grafted polyol which is 20% acrylic acid grafted where the polyol is PC.

GM: A grafted polyol which is 7.2% maleic acid grafted where the polyol is PC.

GN: A grafted polyol which is 7.2% fumaric acid grafted where the polyol is PC.

GO: A grafted polyol which is 10% acrylic acid grafted where the polyol is TPG.

GP: A polyol blend comprising 75% graft polyol PC and 25% polymer polyol PK.

TPG: Tripropylene glycol

MEK: Methyl ethyl ketone

TMXDI: m-1,1,3,3-tetramethylxylylene diisocyanate (supplied by American Cyanamid)

IPDI: 3-isocyanatomethyl-3,5,5 trimethylcyclohexyl isocyanate (Isophorone diisocyanate)

TDI: A mixture of 80 wt. % 2,4 diisocyanatotoluene and 20 wt. % 2,6 diisocyanatotoluene T-12: Tin catalyst manufactured by M&T Chemicals (Dibutyltin dilaurate)

TEA: Triethylamine (supplied by Aldrich Chemical)

EDA: Ethylene diamine

° C.: Degree Centigrade grams: Grams

GENERAL PROCEDURE

Unless otherwise indicated in the Examples, the polymers were prepared according to the general procedures described in "Agueous Emulsions, Dispersions and Solutions of Polyurethanes: Synthesis and Properties", D./Dieterich, *Progress in Organic Coatings*, 9 (1981) 281–340. The basic steps in this procedure for making the acid containing isocyanate-terminated prepolymers, the salt containing isocyanate-terminated prepolymers and then curing these prepolymers on a laboratory scale are:

1. Preparation of the Acid Containing Isocyanate Terminated Prepolymer

A three neck flask is charged with the isocyanate; the carboxylic acid containing polyether is added together with other additives such as catalyst and solvent (which may be removed later). The mixture is then heated and allowed to exotherm to a maximum of 80° C. The mixture is then heated at that temperature for about 4 hours to form an isocyanate terminated prepolymer. The % free NCO is determined an heating continued until the theoretical value (or lower) is obtained.

2. Preparation of the Salt Containing Isocyanate-Terminated Prepolymer

The hot prepolymer is added to an amine as a steady rate with vigorous stirring, optionally under agueous conditions. The stirring is continued for about 15 minutes after addition of the prepolymer is complete. The viscosity of the salt containing prepolymer can be adjusted by the addition of solvent (either water or organic). The amount of amine is normally eguivalent to the carboxylic acid groups in the polyol but can be in excess or deficiency depending on the desired salt prepolymer properties.

Comparative Experiments 1 and 2 (Table II) show the problems associated with the materials already described in the art namely those utilizing di-carboxylic acids grafted onto the polyether backbone.

TABLE I

Summary of Experimental Polymers

| Experiment Number | 1 | 2 | 3 | 4 | 5 | 6 | 7 | 8 | 9 |
|---|---|---|---|---|---|---|---|---|---|
| Polyol Type | PC | GA | GB | GC | GD | GE | GF | GG | GH |
| Isocyanate Type | IPDI | IPDI | IPDI | IPDI | IPDI | IPDI | IPDI | IPDI | IPDI |
| Polyol Wt. (grams) | 100.3 | 140 | 130 | 270 | 140 | 140.1 | 140 | 130 | 130 |
| Isocyanate Wt. (grams) | 33.3 | 91.8 | 36.6 | 84.9 | 25.7 | 16.4 | 5.9 | 11.3 | 7 |
| Methylethylketone Wt. (grams) | 33.7 | 58 | 41.7 | 88.7 | 41.4 | 39.1 | 36.5 | 35.3 | 34.3 |
| Dibutyltin dilaurate Wt. (grams) | 0.88 | 1.45 | 1.04 | 2.22 | 1.04 | 0.98 | 0.91 | 0.88 | 0.86 |
| NCO/OH ratio (prepol) | 1.5 | 1.3 | 1.2 | 1.5 | 2 | 2 | 2 | 1.5 | 1.5 |
| Theoretical NCO | 2.5 | 2.75 | 1.1 | 2.6 | 2.33 | 1.58 | 0.61 | 0.8 | 0.51 |
| Measured NCO | 2.41 | 2.36 | 0.7 | 1.89 | 1.0 | 1.2 | NM | NM | NM |
| Water Wt. (grams) | 183.2 | 320.1 | 232.2 | 499.8 | 238.6 | 302.5 | 211 | 202.4 | 196.7 |
| Triethylamine Wt. (grams) | — | 13.1 | 13.3 | 27 | 16.5 | 16.1 | 17.4 | 15.33 | 15.5 |
| Ethylene diamine Wt. (grams) | 3.1 | 5.7 | 1.7 | 8.3 | 3.5 | 2.2 | 0.8 | 1 | 0.6 |
| % Solids | — | 40 | 40 | 40 | 40 | 34 | 40 | 40 | 40 |
| Viscosity (cps at 24° C.) | — | 50 | 100 | 255 | 210 | 30 | 45 | 375 | 382 |
| Appearance | Separated solid + liquid | Milky white emulsion | Clear golden liquid | Clear golden liquid | Clear golden liquid | Clear golden liquid | Clear pale orange liquid | Clear golden liquid | Clear golden liquid |

| Experiment Number | 10 | 11 | 12 | 13 | 14 | 15 | 16 | 17 | 18 | 19 |
|---|---|---|---|---|---|---|---|---|---|---|
| Polyol Type | GI | GJ | GK | GL | GO | GP | GC | GC | GC | GC |
| Isocyanate Type | IPDI | IPDI | IPDI | IPDI | IPDI | IPDI | TMXDI | TDI | IPDI | IPDI |
| Polyol Wt. (grams) | 130 | 100 | 130 | 270 | 56.1 | 150.1 | 140.3 | 130.0 | 130.0 | 130.0 |
| Isocyanate Wt. (grams) | 26.2 | 36 | 7 | 55.6 | 66.7 | 30.2 | 36.4 | 30.7 | 36.6 | 36.6 |
| Methylethylketone Wt. (grams) | 39 | 34 | 34.3 | 81.4 | 53.2 | 43.3 | 42.4 | 40.2 | 41.7 | 41.7 |
| Dibutyltin dilaurate Wt. (grams) | 0.98 | 0.9 | 0.86 | 2.03 | 0.79 | 1.13 | 1.1 | 1.0 | 1.0 | 1.0 |
| NCO/OH ratio (prepol) | 1.5 | 2.5 | 1.5 | 1.5 | 1.2 | 1.5 | 1.5 | 1.5 | 1.4 | 1.4 |
| Theoretical NCO | 1.68 | 4.8 | 0.51 | 1.71 | 2.72 | 1.68 | 1.89 | 2.45 | 1.89 | 1.89 |
| Measured NCO | 1.1 | 4.0 | 0.4 | NM | NM | 1.62 | 1.33 | 2.4 | 1.79 | 1.80 |
| Water Wt. (grams) | 219.8 | 557.1 | 193.7 | 523.2 | 226.1 | 265.4 | 252 | 227.2 | 37 | — |
| Triethylamine Wt. (grams) | 13.1 | 5.1 | 13.5 | 54.2 | 5.1 | 8.9 | 11.26 | 13 | 13 | 13 |
| Ethylene diamine Wt. (grams) | 2.4 | 5.8 | 0.6 | 5.0 | 3.1 | 2.7 | 3 | 3.5 | 2.8 | 2.8 |
| % Solids | 36 | 20 | 40 | 40 | 32 | 38.6 | 39.5 | 40 | 70 | 80 |
| Viscosity (cps at 24° C.) | 350 | 25 | 720 | 70 | 16 | 320 | 80 | 133 | 6150 | 12100 |
| Appearance | Clear liquid | Milky white emulsion | Turbid yellow liquid | Hazy golden liquid | Milky white emulsion | Milky white emulsion | Hazy golden liquid | Hazy golden liquid | Hazy golden liquid | Clear golden liquid |

NM = Not Measured

3. Prepolymer Chain Extension

The salt-containing isocyanate terminated prepolymer is chain extended with an amine curative. This curative is normally added dropwise under vigorous stirring. The stirring is continued for about 15 minutes after addition of the curative is complete. The viscosity of the fully reacted polymer can be adjusted by the addition of solvent (either water or organic). The fully reacted polymers were then stored in closed containers.

EXAMPLES

The formulations evaluated are shown in Tables I and II. These tables lists the component weights used to formulate the polymers together with their characteristics. Table I shows the polymers prepared from this invention. In comparison Table II shows the polymers prepared from the di acid grafted polyethers already described in the art.

Example 1 is a control where no carboxylic acid is grafted onto the polyether. This material rapidly settled into 2 layers, the polymer being totally incompatible with the water/solvent blend. This experiment clearly shows the need of the acid groups to promote salt formation and hence water compatibility.

Experiments 2 through 16 clearly show the broad utility of the present invention. Polymers are prepared from a broad range of polyols, these ranged from milky white emulsions to clear, golden liguids.

TABLE II

Comparative Experiments
Polymers Prepared from Di-Acid Grafted Polyethers

| Comparative Experiment | 1 | 2 |
|---|---|---|
| Polyol Type | GM | GN |
| Isocyanate Type | IPDI | IPDI |
| Polyol Wt. (grams) | 130.0 | 130. |
| Isocyanate Wt. (grams) | 53.4 | 44.1 |
| Methylethylketone Wt. (grams) | 45.9 | 43.5 |
| Dibutyltin dilaurate Wt. (grams) | 1.06 | 1.09 |
| Water Wt. (grams) | 327.5 | 244.4 |
| Triethylamine Wt. (grams) | 11.7 | 12.8 |
| Ethylene diamine Wt. (grams) | 4.8 | 4.0 |
| NCO/OH ratio (prepol) | 1.5 | 1.5 |
| % Solids | 35.0 | 33.0 |
| Viscosity (cps at 25° C.) | 607.0 | 174.0 |
| Appearance | Turbid brown liquid | Turbid brown liquid |

The polymers prepared from the di-acid grafted polyethers were substantially darker than those prepared from mono-acid grafted polyethers. Upon addition of teh isocyanate to the polyol to form the acid containing isocyanate-terminated prepolymer the di-acid grafted polyethers rapidly turned a dark amber color. This color remained in the product during the preparation and resulted in polymers that were brown in color. In contrast prepolymers prepared from mono-carboxylic acid grafted polyethers were pale yellow in color. The resultant polymers were also excellent in color ranging from milky white emulsions to clear honey colored liquids, Table I.

In addition an unusual phenomenon was noted with the polymers prepared from di-acid grafted polyethers. The materials contained bubbles for one to three days after the experiment and some "gassing" occurred. This is undesirable as the polymers will not be usable until this "gassing" is complete. In contrast, the mono-acid grafted polyethers show no "gassing" and clear bubble-free liquids are obtainable within hours of the preparation being completed.

It is thought the above problems are related to possible anhydride formation caused by dehydration of the di acid. It is anticipated that fumaric acid will give a better product than maleic acid as it cannot readily form the anhydride until after acid grafting has taken place. However, after grafting both products will readily undergo anhydride formation. The mono-carboxylic acid grafted polyethers which are the subject of this invention do not readily undergo anhydride formation and no gas formation is seen during the polymer preparation.

It can also be seen that the polymers prepared from di-acid grafted polyethers have substantially higher viscosities than polymers prepared from comparable mono acid grafted polyethers.

TABLE III

| Relative Viscosities of Polymers (diluted to constant 33% Solids) | |
|---|---|
| Polyol | Viscosity @ 24° C. (cps) |
| Experiment 4 (mono-acid) | 35 |
| Experiment 14 (di-acid) | 542 |
| Experiment 15 (di-acid) | 174 |

The higher viscosity is undesirable as it will limit the solids level that produces a usable polymer. Higher viscosity polymers will also make preparation and handling more difficult as eguipment constraints will be greater with the viscous products.

Relative Storage Stability — Polyol GC vs Polyol GN

The relative storage stability of a mono carboxylic acid grafted polyether was compared to a di-carboxylic acid grafted polyether. This was accomplished by heating the polyols in an oven for 14 hours at 110° C. and measuring the change in water content during this time.

TABLE IV

| Effect of Heating on Mono and Di-acid Grafted Polyethers | | |
|---|---|---|
| Polyol | Initial Water Content | Water Content after 14 hours @ 110° C. |
| Polyol GC (mono-acid) | 0.14% | 0.19% |
| Polyol GN (di-acid) | 0.20% | 0.40% |

The above results clearly show the improved stability of the mono acid grafted polyether over the di-acid grafted polyether. This accelerated aging indicates that on prolonged storage a di acid grafted polyether will generate significant amounts of water. This is undesirable as this will significantly increase the amount of isocyanate needed in the prepolymer formation step.

I claim:

1. An acid-containing, isocyanate terminated prepolymer of the formula:

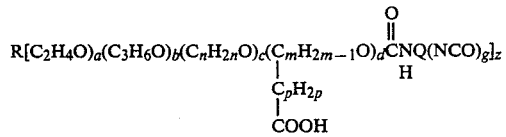

wherein:
R is an initiator radical based on a compound containing Zerewitinoff active hydrogen
a is zero to 175;
b is zero to 175;
c is zero to 175;
d is 1 to 60;
m is 2 to n;
n is 4 to 20;
p is 2 to 10;
Q is an organic radical;
g is 1 to 6;
z is an integer derived from the number of Zerowitinoff active hydrogen atoms on R; and
a+b+c is at least one.

2. The prepolymer of claim 1 wherein a is 0 to 90, b is 0 to 90, c is 0 to 90 and d is 1 to 20.

3. The prepolymer of claim 1 wherein z is 2 to 6.

4. The prepolymer of claim 3 wherein z is 2 to 3.

5. The prepolymer of claim 1 wherein n is 4 to 8.

6. The prepolymer of claim 1 wherein Q is selected from the group consisting of phenyl, substituted phenyl, diphenylmethyl, naphthyl, hexyl, cyclohexyl, dicyclohexylmethyl, substituted cyclohexyl, xylylic, and substituted xylylic.

7. The prepolymer of claim 1 wherein a is 0 to 90, b is 0 to 90, c is 0 to 90, d is 1 to 20, z is 2 to 6, n is 4 to 8 and m is 2 to 8.

8. The prepolymer of claim 7 wherein z is 2 to 3.

9. The prepolymer of claim 8 wherein Q is selected from the group consisting of substituted cyclohexyl, substituted xylylic, substituted phenyl, and dicyclohexylmethyl.

10. A process for the manufacture of a salt-containing isocyanate terminated prepolymer which comprises reacting the acid containing isocyanate terminated prepolymer with a base.

11. A salt-containing isocyanate terminated prepolymer of the formula:

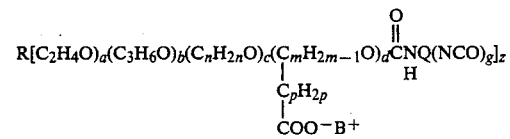

wherein R, a, b, c, d, m, n, p, Q, g and z are as defined in claim 1 and B+ is a cation.

12. The prepolymer of claim 11 wherein a is 0 to 90, b is 0 to 90, c is 0 to 90 and d is 1 to 20.

13. The prepolymer of claim 11 wherein z is 2 to 6.

14. The prepolymer of claim 13 wherein z is 2 to 3.

15. The prepolymer of claim 11 wherein n is 4 to 8.

16. The prepolymer of claim 11 wherein Q is selected from the group consisting of phenyl, substituted phenyl, diphenylmethyl, naphthyl, hexyl, cyclohexyl, dicyclohexylmethyl, substituted cyclohexyl, xylylic, and substituted xylylic.

17. The prepolymer of claim 11 wherein a is 0 to 90, b is 0 to 90, c is 0 to 90, d is 1 to 20, z is 2 to 6, n is 4 to 8 and m is 2 to 8.

18. The prepolymer of claim 17 wherein 2 is 2 to 3.

19. The prepolymer of claim 18 wherein Q is selected from the group consisting of substituted cyclohexyl, substituted xylylic, substituted phenyl, and dicyclohexylmethyl.

20. A process for the manufacture of a polymer which comprises reacting an isocyanate-terminated prepolymer selected from the group consisting of acid-containing isocyanate-terminated prepolymer of claim 1 and the salt containing isocyanate prepolymers of claim 11 with an isocyanate reactive multi-functional material.

21. A polymer containing at least one unit of the general formula:

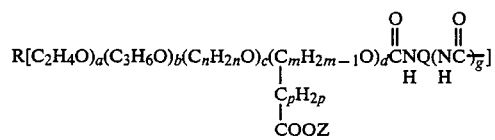

wherein R, a, b, c, d, m, n, p and Q are as defined in claim 2 and Z is either H+ or B+ wherein B+ is as defined in claim 11.

22. The polymer of claim 21 wherein a is 0 to 90, b is 0 to 90, c is 0 to 90 and d is 1 to 20.

23. The polymer of claim 21 wherein z is 2 to 6.

24. The polymer of claim 23 wherein z is 2 to 3.

25. The polymer of claim 21 wherein n is 4 to 8.

26. The polymer of claim 21 wherein Q is selected from the group consisting of phenyl, substituted phenyl, diphenylmethyl, naphthyl, hexyl, cyclohexyl, dicyclohexylmethyl, substituted cyclohexyl, xylylic, and substituted xylylic.

27. The polymer of claim 21 wherein a is 0 to 90, b is 0 to 90, c is 0 to 90, d is 1 to 20, z is 2 to 6, n is 4 to 8 and m is 2 to 8.

28. The polymer of claim 27 wherein z is 2 to 3.

29. The polymer of claim 28 wherein Q is selected from the group consisting of substituted cyclohexyl, substituted xylylic, substituted phenyl, and dicyclohexylmethyl.

* * * * *